United States Patent  (10) Patent No.: US 10,877,912 B1
Morrissey et al.  (45) Date of Patent: Dec. 29, 2020

(54) SERIAL IN-LINE COMMUNICATION GUARD

(71) Applicant: Rockwell Collins, Inc., Cedar Rapids, IA (US)

(72) Inventors: Patrick J. Morrissey, Cedar Rapids, IA (US); Matthew L. Weber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/144,173

(22) Filed: Sep. 27, 2018

(51) Int. Cl.
  *G06F 13/40* (2006.01)
  *G06F 13/20* (2006.01)
  *G06F 13/00* (2006.01)

(52) U.S. Cl.
  CPC .......... *G06F 13/4004* (2013.01); *G06F 13/20* (2013.01)

(58) Field of Classification Search
  CPC ................................. G06F 13/40; G06F 13/20
  USPC .......................................................... 710/36
  See application file for complete search history.

(56) References Cited

U.S. PATENT DOCUMENTS

| | | | | |
|---|---|---|---|---|
| 6,330,610 B1* | 12/2001 | Docter | .................. | G06F 16/335 709/229 |
| 7,606,254 B1* | 10/2009 | Hardin | .................... | G06F 21/85 370/386 |
| 8,869,270 B2* | 10/2014 | Touboul | .............. | H04L 63/0209 726/22 |
| 9,059,853 B1* | 6/2015 | Bortz | ........................ | H04L 9/32 |
| 10,075,472 B2* | 9/2018 | Leung | ................ | H04L 63/1408 |
| 2006/0136338 A1* | 6/2006 | Maor | ....................... | G06F 21/57 705/51 |
| 2006/0137008 A1* | 6/2006 | Maor | ....................... | G06F 21/57 726/22 |
| 2016/0306966 A1* | 10/2016 | Srivastava | .............. | G06F 21/31 |
| 2017/0154058 A1* | 6/2017 | May | .................... | G06F 16/2457 |
| 2018/0034834 A1* | 2/2018 | Mitchell | ............... | G06F 21/606 |
| 2018/0076971 A1* | 3/2018 | Linderman | ......... | H04L 12/4013 |
| 2019/0121961 A1* | 4/2019 | Coleman | ............ | H04L 41/0803 |

* cited by examiner

*Primary Examiner* — Christopher B Shin
(74) *Attorney, Agent, or Firm* — Suiter Swantz pc llo

(57) ABSTRACT

A communication network includes a low integrity device, a high integrity device, a communication bus communicably coupling the low integrity device and the high integrity device together, and a communication guard inserted in-line along the communication bus. The communication guard includes a filter configured to store one or more rules defining at least one of a rate, a size, or a content type that is permissible for data transmissions from the low integrity device to the high integrity device; receive a respective data transmission from the low integrity device; evaluate characteristics of the respective data transmission relative to the one or more rules; and prevent the respective data transmission from passing through the communication guard to the high integrity device in response to the characteristics of the respective data transmission failing to comply with at least one of the one or more rules.

20 Claims, 6 Drawing Sheets

SERIAL IN-LINE COMMUNICATION GUARD

BACKGROUND

Aircraft systems are becoming more interconnected such that legacy systems are being patched into new router class devices. Such interconnection traditionally has required customized devices and installation for a particular implementation to protect the integrity of the systems, which drives up the cost of each implementation.

SUMMARY

In one aspect, the inventive concepts disclosed herein are directed to a communication network for an aircraft. The communication network includes a low integrity device, a high integrity device, a communication bus communicably coupling the low integrity device and the high integrity device together, and a communication guard inserted in-line along the communication bus such that the communication guard is positioned between the low integrity device and the high integrity device. The communication guard includes a filter configured to store one or more rules defining at least one of a rate, a size, or a content type that is permissible for data transmissions from the low integrity device to the high integrity device; receive a respective data transmission from the low integrity device; evaluate characteristics of the respective data transmission relative to the one or more rules; and prevent the respective data transmission from passing through the communication guard to the high integrity device in response to the characteristics of the respective data transmission failing to comply with at least one of the one or more rules.

In a further aspect, the inventive concepts disclosed herein are directed to a communication guard. The communication guard includes an input configured to couple to an untrusted device, an output configured to couple to a trusted device, and a filter coupled between the input and the output. The filter is configured to store one or more rules defining characteristics that are permissible for data transmissions received from the untrusted device, receive a respective data transmission from the untrusted device, evaluate the characteristics of the respective data transmission relative to the one or more rules, and prevent the respective data transmission from passing through the communication guard to the trusted device in response to the characteristics of the respective data transmission failing to comply with at least one of the one or more rules.

In a further aspect, the inventive concepts disclosed herein are directed to a method for selectively restricting a data transmission sent from an untrusted device to a trusted device. The method includes storing, by a communication guard, one or more rules defining characteristics that are permissible for data transmissions received from the untrusted device; inserting the communication guard in-line along a communication bus that communicably couples the untrusted device to the trusted device such that the communication guard is positioned between the untrusted device and the trusted device; receiving, by the communication guard, a respective data transmission from the untrusted device; evaluating, by the communication guard, the characteristics of the respective data transmission relative to the one or more rules; and preventing, by the communication guard, the respective data transmission from passing through the communication guard to the trusted device in response to the characteristics of the respective data transmission failing to comply with at least one of the one or more rules.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
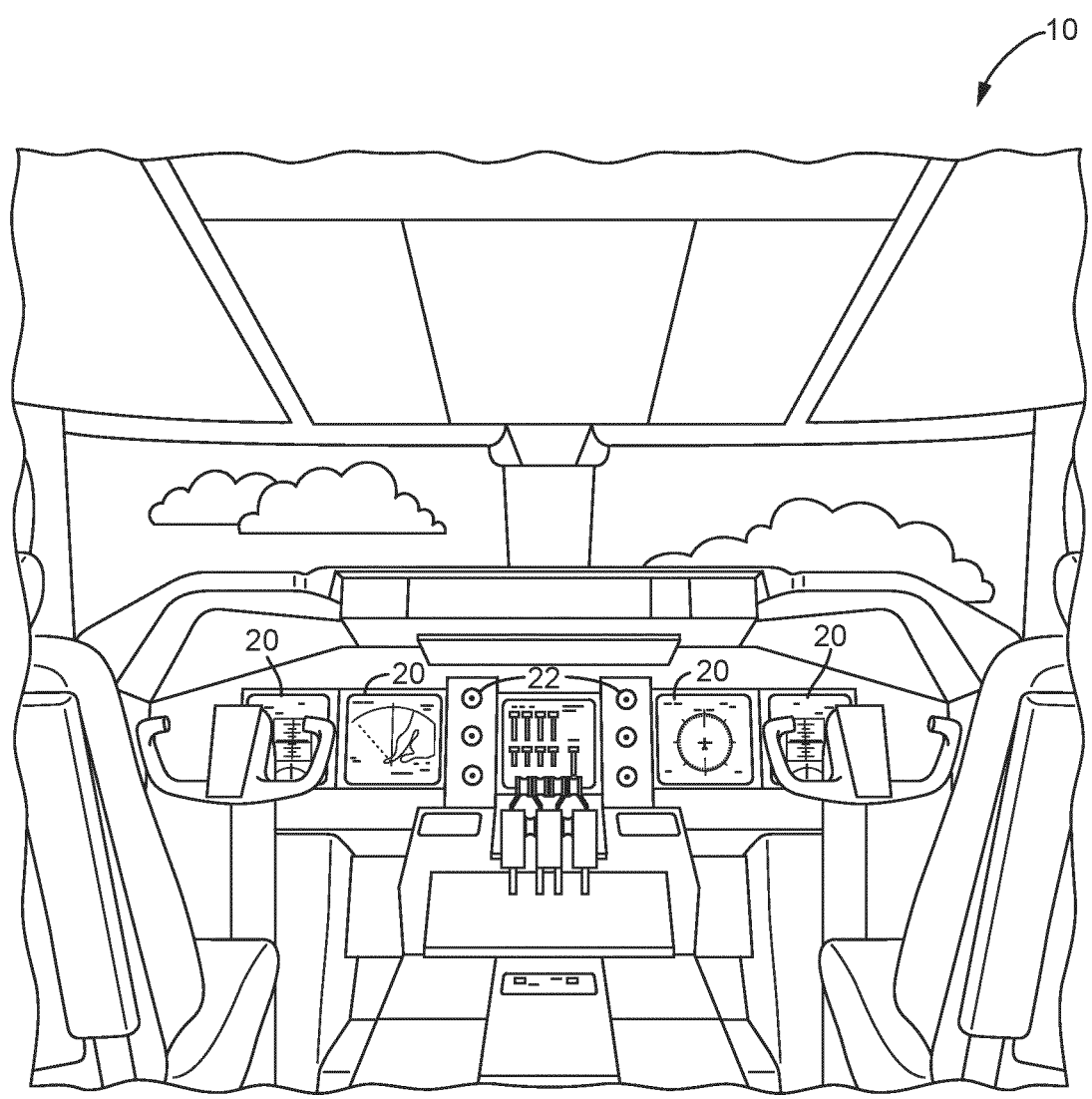
FIG. 1 is a schematic illustration of a control center, according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a serial, in-line communication guard device (e.g., a "bump in the wire" guard device, a firewall device, etc.) that may be uniquely designed and tailored to communicably couple devices having disparate integrities relative to each other, while mitigating any risk associated with such connection. By way of example, as aircrafts become more interconnected, legacy systems, which were not originally designed to be connected to the internet and do not have the appropriate protections, are being patched into new router class devices, which are often developed at a lower design assurance level ("DAL"). This creates risk for higher criticality systems that need to send data through the lower DAL systems but not consume data from the lower DAL systems to protect their own integrity. This results in the need for customized line replacement units ("LRUs") that require communication components that are tightly coupled in design to a particular use case. With each installation being unique, more variations of LRUs are required, which drives up the cost of each implementation.

The communication guard device of the present disclosure is configured to (i) be inserted in-line with a communication bus connecting a lower DAL system (e.g., a low integrity device, an untrusted device, etc.) and a higher DAL system (e.g., a high integrity device, a trusted device, etc.) and (ii) evaluate and selectively restrict data transmissions therebetween. The communication guard device may thereby enable LRUs that perform aggregate data processing to have generic interfaces, which may then be repurposed between aircraft types and use cases, while the communication guard devices are inserted into the wiring to protect and inspect communication flows "on the wire." As used herein, a "high integrity" device refers to a device that has a critical function that needs to be preserved for operation of an aircraft by ensuring all data operating on the device is appropriate (e.g., correct, suitable, safe, uncorrupted, etc.). As used herein, a "low integrity" device refers to a device that has a secondary or ancillary function that does not need to be preserved for operation of an aircraft.

Referring to FIG. 1, a schematic illustration of a control center, shown as aircraft cockpit 10, is shown according to an exemplary embodiment of the inventive concepts disclosed herein. The aircraft cockpit 10 may include one or more displays, shown as flight displays 20, and one or more user interface (UI) elements, shown as UI elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass®, and so on. The flight displays 20 may be used to provide information to the flight crew, thereby increasing the flight crew's visual range and enhancing their decision-making abilities. The flight displays 20 may be configured to function as, for example, a primary flight display (PFD) used to display altitude, airspeed, vertical speed, navigation and traffic collision avoidance system (TCAS) advisories, and/or a crew alert system (CAS) configured to provide alerts to the flight crew. The flight displays 20 may also be configured to function as, for example, a multi-function display used to display navigation maps, weather radar, electronic charts, TCAS traffic, aircraft maintenance data and electronic checklists, manuals, and procedures. The flight displays 20 may also be configured to function as, for example, an engine indicating and crew-alerting system (EICAS) display used to display critical engine and system status data. Other types and functions of the flight displays 20 are contemplated and will be apparent to those skilled in the art.

In some embodiments, the flight displays 20 may provide an output from an aircraft-based system, a ground-based system, a satellite-based system, or from a system of another aircraft. For example, in one embodiment, the flight displays 20 provide an output from a ground-based weather radar system. In some embodiments, the flight displays 20 provide an output from an aircraft-based weather radar system, LIDAR system, infrared system or other system on the aircraft. For example, the flight displays 20 may include an avionics display, a joint display, an air traffic display, a weather radar map, and a terrain display. The flight displays 20 may include an electronic display or a synthetic vision system (SVS). For example, the flight displays 20 may include a display configured to display a two-dimensional (2-D) image, a three-dimensional (3-D) perspective image of air traffic data, terrain, and/or weather information, or a four-dimensional (4-D) display of weather information or forecast information. Other views of air traffic information, terrain, and/or weather information may also be provided (e.g., plan view, horizontal view, and vertical view). The views shown on the flight displays 20 may include monochrome or color graphical representations of the displayed information. Graphical representations of the displayed information may include an indication of altitude of other aircraft, weather conditions, or terrain, or the altitude and/or location of such information relative to the aircraft.

The UI elements 22 may include, for example, dials, switches, buttons, touch screens, keyboards, a mouse, joysticks, cursor control devices (CCDs), or other multi-function key pads certified for use with avionics systems. The UI elements 22 may be configured to, for example, allow an aircraft crew member to interact with various avionics applications and perform functions such as data entry, manipulation of navigational maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew member to adjust the brightness, contrast, and information displayed on the flight displays 20. The UI elements 22 may additionally be used to acknowledge or dismiss an indicator provided by the flight displays 20. Further, the UI elements 22 may be used to correct errors on the flight displays 20. Other UI elements 22, such as indicator lights, displays, display elements, and audio alerting devices, may be configured to warn of potentially threatening conditions such as severe weather, terrain, and obstacles.

Figure 2:
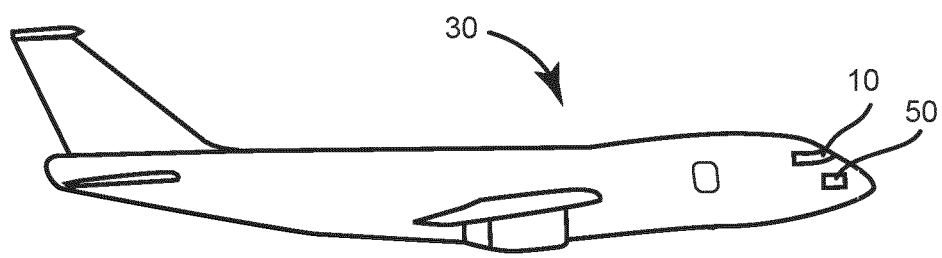
FIG. 2 is a side-view schematic illustration of an aircraft with the control center of FIG. 1 and a communication network, according to the inventive concepts disclosed herein.

Referring now to FIG. 2, a side-view schematic illustration of a vehicle, shown as aircraft 30, with the aircraft cockpit 10 and a communication network, shown as aircraft communication network 50, is shown according to an exemplary embodiment. As shown in FIG. 2, the aircraft 30 is an airplane. In other embodiments, the aircraft 30 is another type of aviation vehicle (e.g., a jet, a spacecraft, a helicopter, etc.). In still other embodiments, the communication network is implemented in a non-aerial vehicle such as a train, a bus, a car, etc. In yet other embodiments, the communication network is implemented in non-vehicle applications (e.g., building applications, home applications, etc.).

According to the various exemplary embodiments shown in FIGS. 3-7, the aircraft communication network 50 includes an untrusted device or a relatively lower integrity device, shown as low integrity device 100, communicably coupled to a trusted device or a relatively higher integrity device, shown as high integrity device 200, via a communication bus, shown as communication bus 400, having a communication guard device, shown as communication guard 300, positioned therealong. According to an exemplary embodiment, the communication guard 300 is configured to be inserted in-line along the communication bus 400 such that the communication guard 300 is positioned between the low integrity device 100 and the high integrity device 200 (e.g., in a serial alignment, etc.). In one embodiment, the communication guard 300 is powered through the aircraft communication network 50 (e.g., through voltage provided as data is passed along the communication bus 400 between the low integrity device 100 and the high integrity device 200, etc.). In other embodiments, the communication guard 300 includes a power source or power bus independent of and external relative to the aircraft communication network 50.

The low integrity device 100 may be or include devices such as an in-flight entertainment system, an in-flight router/Wi-Fi system, and/or other devices or systems that perform secondary or ancillary functions that are not critical for the operation of the aircraft 30. The high integrity device 200 may be or include devices such as an autopilot system, cockpit displays (e.g., flight displays 20, etc.), and/or other devices or systems that perform functions critical for the operation of the aircraft 30.

Figure 3:
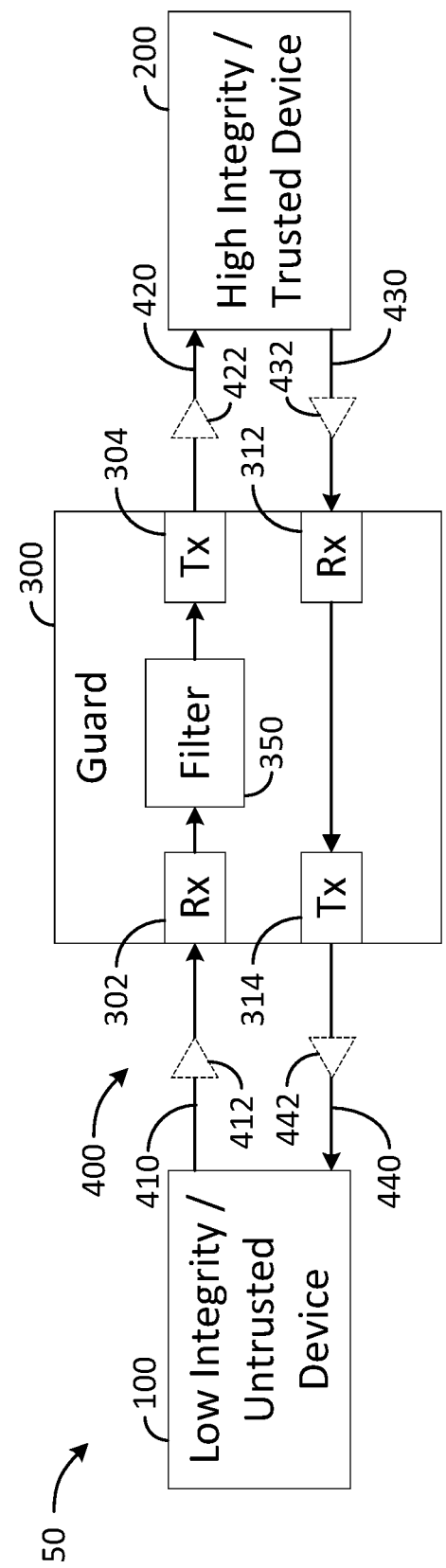
FIG. 3 is a first schematic diagram of the communication network of FIG. 2 including a guard device connected between a low integrity device and a high integrity device, according to the inventive concepts disclosed herein.
Figure 4:
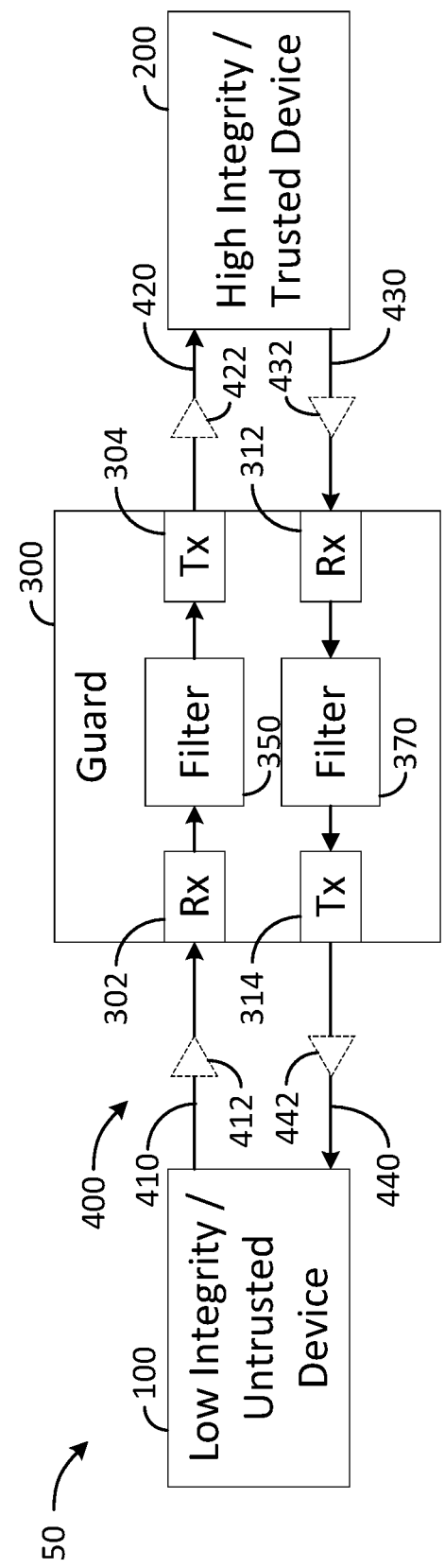
FIG. 4 is a second schematic diagram of the communication network of FIG. 2 including a guard device connected between a low integrity device and a high integrity device, according to the inventive concepts disclosed herein.
Figure 5:
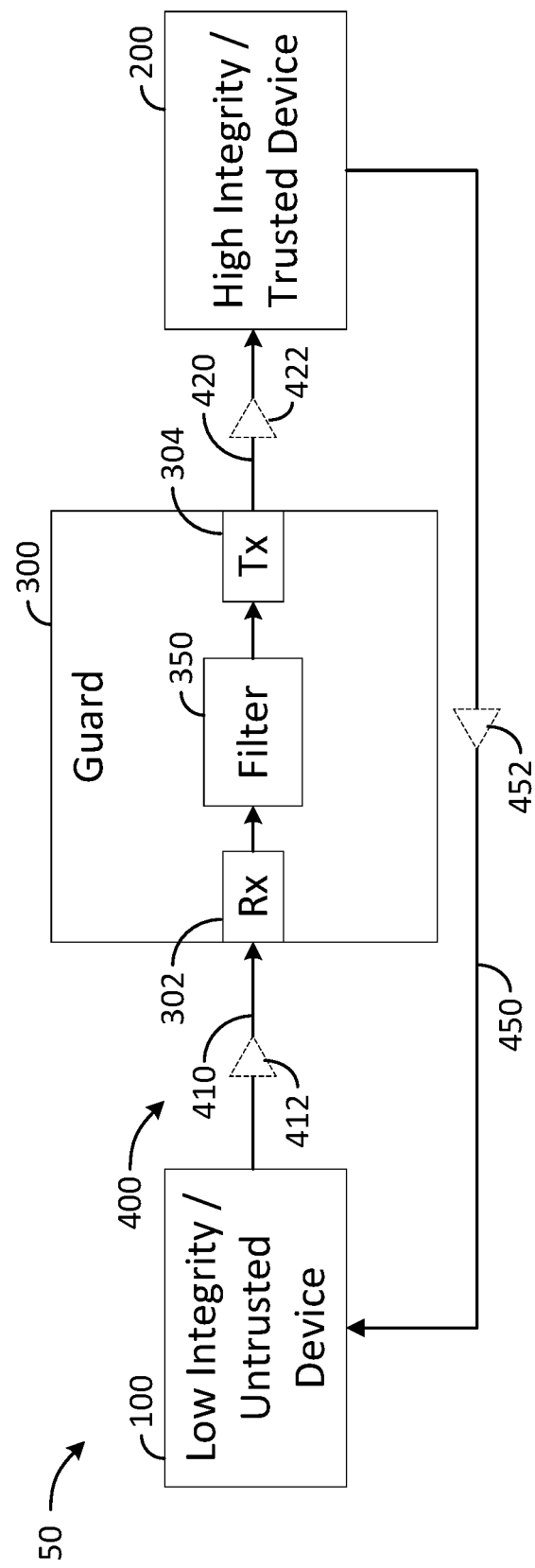
FIG. 5 is a third a schematic diagram of the communication network of FIG. 2 including a guard device connected between a low integrity device and a high integrity device, according to the inventive concepts disclosed herein.

As shown in FIGS. 3-7, the communication guard 300 includes a first input, shown as low integrity receiver 302, a first output, shown as high integrity transmitter 304, and a filter device, shown as filter 350, coupled (e.g., connected, etc.) between the low integrity receiver 302 and the high integrity transmitter 304. As shown in FIGS. 3-7, the communication bus 400 includes a first connection leg that connects the low integrity device 100 to the high integrity device 200 to permit data transfer from the low integrity device 100 to the high integrity device 200. The first connection leg of the communication bus 400 includes a first connector (e.g., a wire, Ethernet, fiber optic, CAN bus, a coaxial cable, a data-transmitting cable, etc.), shown as low integrity output connector 410, extending between the low integrity device 100 and the communication guard 300 to couple the low integrity device 100 to the low integrity receiver 302 of the communication guard 300 to facilitate data transfer from the low integrity device 100 to the communication guard 300. As shown in FIGS. 3-5, the communication bus 400 optionally includes a first passive device, shown as first diode 412, positioned between the low integrity device 100 and the communication guard 300, along the low integrity output connector 410 of the first connection leg of the communication bus 400. According to an exemplary embodiment, the first diode 412 is configured to force the directionality of data flow along the low integrity output connector 410 such that data does not flow from the communication guard 300 to the low integrity device 100 along the low integrity output connector 410.

As shown in FIGS. 3-5, the first connection leg of the communication bus 400 includes a second connector (e.g., a wire, Ethernet, fiber optic, CAN bus, a coaxial cable, a data-transmitting cable, etc.), shown as high integrity input connector 420, extending between the communication guard 300 and the high integrity device 200 to couple the high integrity device 200 to the high integrity transmitter 304 of the communication guard 300 to facilitate data transfer from the communication guard 300 to the high integrity device 200 (e.g., data transmitted to the communication guard 300 by the low integrity device 100, etc.). The communication bus 400 optionally includes a second passive device, shown as second diode 422, positioned between the communication guard 300 and the high integrity device 200, along the high integrity input connector 420 of the first connection leg of the communication bus 400. According to an exemplary embodiment, the second diode 422 is configured to force the directionality of data flow along the high integrity input connector 420 such that data does not flow from the high integrity device 200 to the communication guard 300 along the high integrity input connector 420.

Figure 6:
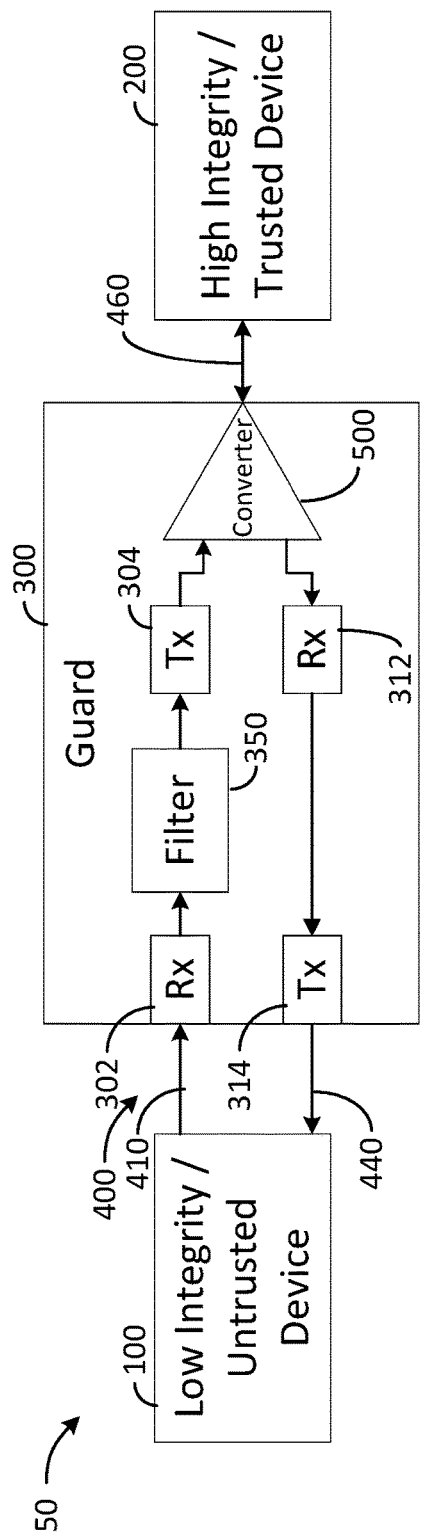
FIG. 6 is a fourth a schematic diagram of the communication network of FIG. 2 including a guard device connected between a low integrity device and a high integrity device, according to the inventive concepts disclosed herein.
Figure 7:
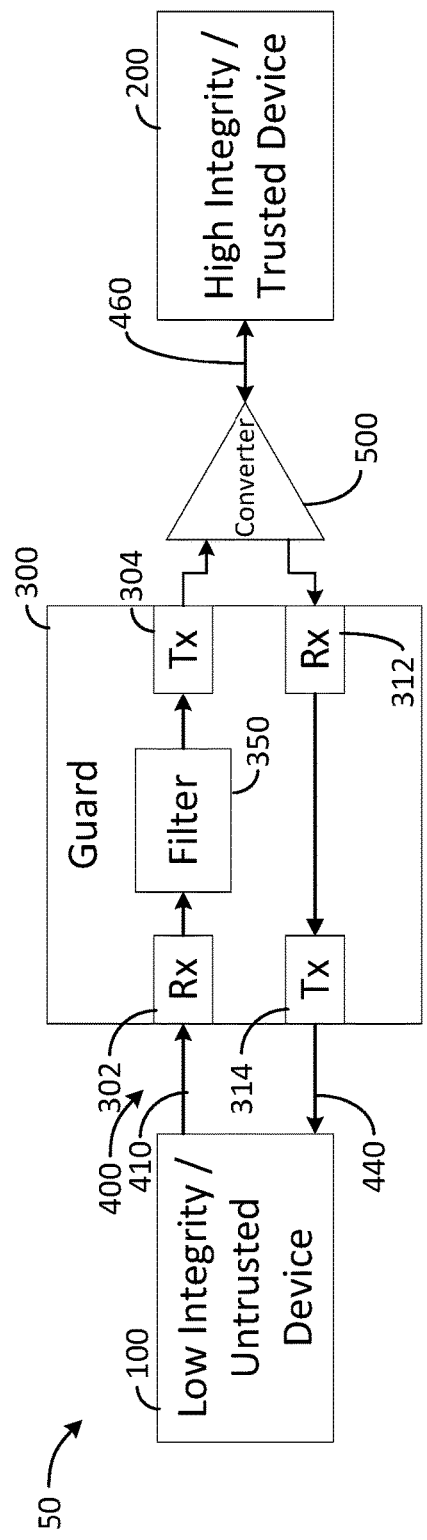
FIG. 7 is a fifth a schematic diagram of the communication network of FIG. 2 including a guard device connected between a low integrity device and a high integrity device, according to the inventive concepts disclosed herein.

As shown in FIGS. 3, 4, 6, and 7, the communication guard 300 includes a second input, shown as high integrity receiver 312, and a second output, shown as low integrity transmitter 314. As shown in FIGS. 3, 6, and 7, the high integrity receiver 312 is directly coupled to the low integrity transmitter 314 such that data received by the high integrity receiver 312 passes through the communication guard 300 to the low integrity transmitter 314 unimpeded (e.g., unchecked, unfiltered, unrestricted, unevaluated, etc.). As shown in FIG. 4, the communication guard 300 includes a second filter, shown as filter 370, coupled (e.g., connected, etc.) between the high integrity receiver 312 and the low integrity transmitter 314 such that data received by the high integrity receiver 312 is evaluated before passing through the communication guard 300 to the low integrity transmitter 314. The filter 370 may perform substantially the same functions, similar functions, some of the functions, and/or different functions as the filter 350 described herein.

As shown in FIGS. 3-5, the communication bus 400 includes a second connection leg that connects the high integrity device 200 to the low integrity device 100 to permit data transfer from the high integrity device 200 to the low integrity device 100. In other embodiments, the communication bus 400 does not include the second connection leg (e.g., one-way communication from the low integrity device 100 to the high integrity device 200, etc.). As shown in FIGS. 3 and 4, the second connection leg of the communication bus 400 includes a third connector (e.g., a wire, Ethernet, fiber optic, CAN bus, a coaxial cable, a data-transmitting cable, etc.), shown as high integrity output connector 430, extending between the high integrity device 200 and the communication guard 300 to couple the high integrity device 200 to the high integrity receiver 312 of the communication guard 300 to facilitate data transfer from the high integrity device 200 to the communication guard 300. The communication bus 400 optionally includes a third passive device, shown as third diode 432, positioned between the high integrity device 200 and the communication guard 300, along the high integrity output connector 430 of the second connection leg of the communication bus 400. According to an exemplary embodiment, the third diode 432 is configured to force the directionality of data flow along the high integrity output connector 430 such that data does not flow from the communication guard 300 to the high integrity device 200 along the high integrity output connector 430.

As shown in FIGS. 3, 4, 6, and 7, the second connection leg of the communication bus 400 includes a fourth connector (e.g., a wire, Ethernet, fiber optic, CAN bus, a coaxial cable, a data-transmitting cable, etc.), shown as low integrity input connector 440, extending between the communication guard 300 and the low integrity device 100 to couple the low integrity device 100 to the low integrity transmitter 314 of the communication guard 300 to facilitate data transfer from the communication guard 300 to the low integrity device 100 (e.g., data transmitted to the communication guard 300 by the high integrity device 200, etc.). The communication bus 400 optionally includes a fourth passive device, shown as fourth diode 442, positioned between the communication guard 300 and the low integrity device 100, along the low integrity input connector 440 of the second connection leg of the communication bus 400. According to an exemplary embodiment, the fourth diode 442 is configured to force the directionality of data flow along the low integrity input connector 440 such that data does not flow from the low integrity device 100 to the communication guard 300 along the low integrity input connector 440.

As shown in FIG. 5, the communication guard 300 does not include the high integrity receiver 312 or the low integrity transmitter 314. Rather, the second communication leg of the communication bus 400 includes a fifth connector (e.g., a wire, Ethernet, fiber optic, CAN bus, a coaxial cable, a coaxial cable, a data-transmitting cable, etc.), shown as bypass connector 450, that (i) replaces the high integrity output connector 430 and the low integrity input connector 440 and (ii) extends from the high integrity device 200 directly to the low integrity device 100, bypassing the communication guard 300 altogether. The communication bus 400 optionally includes a fifth passive device, shown as fifth diode 452, positioned between the high integrity device 200 and the low integrity device 100, along the bypass connector 450 of the second connection leg of the communication bus 400. According to an exemplary embodiment, the fifth diode 452 is configured to force the directionality of data flow along the bypass connector 450 such that data does not flow from the low integrity device 100 to the high integrity device 200 along the bypass connector 450.

As shown in FIGS. 6 and 7, the communication bus 400 does not include the high integrity input connector 420 or the high integrity output connector 430. Rather, the high integrity input connector 420 and the high integrity output connector 430 are replaced with a single connector (e.g., a wire, Ethernet, fiber optic, CAN bus, a coaxial cable, a data-transmitting cable, etc.), shown as bi-directional connector 460, and a protocol conversion device, shown as converter 500. As shown in FIGS. 6 and 7, (i) the converter 500 is coupled to the high integrity transmitter 304 and the high integrity receiver 312 of the communication guard 300 and (ii) the bi-directional connector 460 extends from the converter 500 to the high integrity device 200 to couple the converter 500 to the high integrity device 200 to facilitate data transfer (i) from the communication guard 300 to the high integrity device 200 and (ii) from high integrity device 200 to the communication guard 300. As shown in FIG. 6, the converter 500 is integrated into the communication guard 300 (e.g., disposed within a housing of the communication guard 300, etc.). As shown in FIG. 7, the converter 500 is independent of the communication guard 300 (e.g., connected in-line between the communication guard 300 and the high integrity device 200 along the bi-directional connector 460, etc.).

According to an exemplary embodiment, the converter 500 is configured to facilitate data transfer between the low integrity device 100 and the high integrity device 200 that operate using disparate data and/or communication protocols. By way of example, the low integrity device 100 may use a first communication/data protocol and the high integrity device 200 may use a second, different communication/data protocol. The converter 500 may thereby be configured to (i) receive first data from the low integrity device 100 in the first communication/data protocol (e.g., after being evaluated by the filter 350, etc.) and convert the first data to the second, different communication/data protocol that is useable (e.g., readable, etc.) by the high integrity device 200 and/or (ii) receive second data from the high integrity device 200 in the second, different communication/data protocol and convert the second data to the first communication/data protocol that is useable (e.g., readable, etc.) by the low integrity device 100.

It should be understood that the various embodiments shown in FIGS. 3-7 should not be considered as limiting, but rather the concepts and components of each may be combined or otherwise arranged (e.g., the aircraft communication network 50 of FIG. 5 may include the converter 500, the aircraft communication network 50 of FIGS. 6 and 7 may include the filter 370, the aircraft communication network 50 of FIGS. 6 and 7 may include the first diode 412 and the fourth diode 442, etc.).

Figure 8:
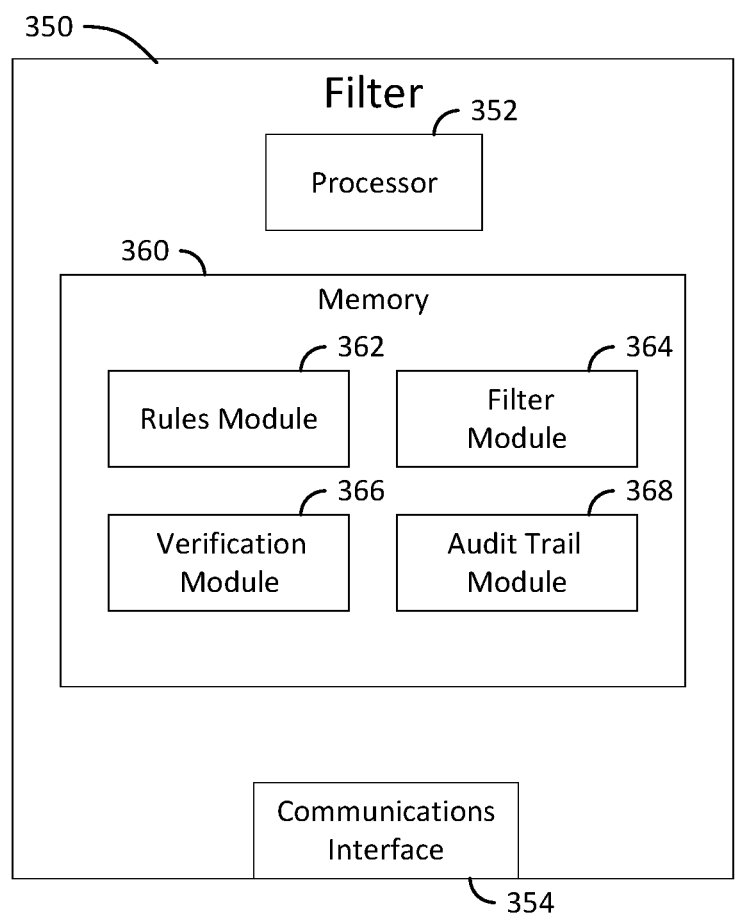
FIG. 8 is a schematic diagram of a filter of the guard device of FIGS. 3-7, according to the inventive concepts disclosed herein.

Referring now to FIG. 8, a block diagram of the filter 350 of the communication guard 300 is shown, according to an exemplary embodiment. As shown in FIG. 8, the filter 350 includes a processor 352, a communications interface 354, and a memory 360. The communications interface 354 is configured to send data to, receive data from, or otherwise facilitate electronic data communications with other components of the communication guard 300 and/or external devices (e.g., the low integrity receiver 302, the high integrity transmitter 304, an external programming device, a user device, etc.). The processor 352 may be coupled with the memory 360, which may comprise a non-transitory processor-readable medium storing processor-executable code and/or data. The processor 352 may be implemented as a specific purpose processor, an application specific integrated circuit (ASIC), one or more field programmable gate arrays (FPGAs), a group of processing components, or other suitable electronic processing components. Any controllers and modules described herein may be implemented as a hardware circuit comprising custom VLSI circuits or gate arrays, semiconductors such as logic chips, transistors, or other discrete components, and may be implemented in programmable hardware devices such as field programmable gate arrays, programmable array logic, programmable logic devices or the like.

The memory 360 is one or more devices for storing data and/or computer code for completing and/or facilitating the various user or client processes, layers, and modules described in the present disclosure. The memory 360 may be or include volatile memory or non-volatile memory and may include database components, object code components, script components, or any other type of information structure for supporting the various activities and information structures of the exemplary embodiments of the inventive concepts disclosed herein. The memory may be a non-transitory machine-readable media for carrying or having machine-executable instructions or data structures stored thereon. By way of example, such machine-readable media may include random access memory (RAM), read only memory (ROM), erasable programmable read only memory (EPROM), electrically erasable programmable memory (EEPROM), CD-ROM, flash memory, or other optical disk storage, magnetic disk storage or other magnetic storage devices, or any other medium which may be used to carry or store desired program code in the form of machine-executable instructions or data structures and which may be accessed by a special purpose computer or other machine with a processor. Combinations of the above are also included within the scope of machine-readable storage media. Machine-executable instructions include, for example, instructions and data which cause a special purpose computer or special purpose processing machine to perform a certain function or group of functions. Machine or computer-readable storage media, as referenced herein, do not include transitory media (i.e., signals in space). The memory 360 may be communicably connected to the processor 352 and include computer code or instruction modules for executing one or more processes described herein.

As shown in FIG. 8, the memory 360 includes a rules module 362, a filter module 364, a verification module 366, and an audit trail module 368. The rules module 362 is configured to receive and store one or more rules that are used by the filter module 364 to evaluate and either permit (e.g., allow to pass though, etc.) or reject data being received thereby (e.g., from the low integrity device 100, etc.). By way of example, the one or more rules stored by the rules module 362 may be or include a first rule that defines a permitted transmission rate or rate range of the data (e.g., a transmission frequency, a transmission frequency range, Hertz, etc.) that the filter 350 may accept from the low integrity device 100 (e.g., based on the requirements for data rates of the high integrity device 200, etc.). By way of another example, the one or more rules stored by the rules module 362 may be or include a second rule that defines a permitted data size of the data (e.g., a maximum data size threshold, etc.) that the filter 350 may accept from the low integrity device 100 (e.g., based on the requirements for data sizes of the high integrity device 200, etc.). By way of still another example, the one or more rules stored by the rules module 362 may be or include a third rule that defines a permitted content type or types of the data (e.g., numeric, alphanumeric, binary, a respective data format, etc.).

In some embodiments, the one or more rules (e.g., the first rule, the second rule, the third rule, etc.) are pre-stored within the rules module 362 at the time of manufacture (e.g., if the requirements and/or specifications of the high integrity device 200 to which the respective communication guard 300 will be coupled to is known at the time of manufacturing, etc.).

In some embodiments, the one or more rules are loaded into the rules module 362 at the time of deployment (i.e., when the communication guard 300 is inserted in-line along the communication bus 400). The one or more rules loaded into the rules module 362 may also be selectively updateable. By way of example, the communications interface 354 may include a connection port that a programming device (e.g., a laptop, a tablet, an external device, a portable device, a user device, etc.) may selectively couple to for loading the one or more rules onto the communication guard 300 and/or updating the rules previously stored therein based on the respective application of the communication guard 300 (e.g., based on the respective high integrity device 200 that the communication guard 300 is connected to, etc.).

By way of another example, the one or more rules may be loaded into and/or updated within the rules module 362 via the high integrity device 200 and/or the low integrity device 100. As an example, the one or more rules may be inputted into the high integrity device 200 (e.g., through a data port thereof, etc.) and transmitted to the filter 350 (e.g., via the high integrity output connector 430, the bi-directional connector 460, etc.) to load the one or more rules to and/or update the one or more rules of the rules module 362. As another example, the one or more rules may be inputted into the low integrity device 100 (e.g., through a data port thereof, etc.) and transmitted to the filter 350 (e.g., via the low integrity output connector 410, etc.) to load the one or more rules to and/or update the one or more rules of the rules module 362. In such an implementation, the verification module 366 may be configured to verify the rule transmission from the low integrity device 100. By way of example, the transmission and/or update of the one or more rules from the low integrity device 100 may be required to include a digital signature or encryption that the verification module 366 is capable of verifying or decrypting prior to the one or more rules being loaded into and/or updated on the rules module 362. The verification module 366 may thereby store a decryption key and/or a record of approved digital signatures. In some embodiments, the verification module 366 is additionally or alternatively configured to verify the rule transmission from the high integrity device 200 and/or the programming device prior to the one or more rules being loaded into and/or updated on the rules module 362.

The filter module 364 is configured to evaluate data transmissions received from the low integrity device 100 by comparing characteristics (e.g., rate, size, content type, etc.) of the data transmissions to the one or more rules stored in the rules module 362. The filter module 364 is configured to allow a respective data transmission received from the low integrity device 100 to be delivered to the high integrity device 200 (i.e., pass through the communication guard 300) in response to the respective data transmission complying with the one or more rules. However, the filter module 364 is configured to prevent a respective data transmission received from the low integrity device 100 to be delivered to the high integrity device 200 in response to the respective data transmission failing to comply with at least one of the one or more rules. By way of example, the filter module 364 may be configured to drop, delete, or otherwise discard of the respective data transmission in response the respective data transmission failing to comply with at least one of the one or more rules.

The audit trail module 368 is configured to store an audit trail regarding communications between the communication guard 300 and the low integrity device 100 and/or the high integrity device 200. By way of example, the communication guard 300 may keep a record of where data transmissions were received from, when the data transmissions were received, what data transmissions were rejected, why the data transmission were rejected, etc. In some embodiments, the audit trail is sent to the low integrity device 100 and/or the high integrity device 200 to be accessible by a user therethrough. In some embodiments, the audit trail is transmitted to an external device (e.g., a laptop, a tablet, a user device, a portable device, etc.) via a direct connection therebetween using the communications interface 354 (e.g., a data port, etc.). In some embodiments, the communications interface 354 includes wireless communications capabilities to facilitate wirelessly transmitting the audit trail to the external device (e.g., Bluetooth, Bluetooth low energy, RFID, Zigbee, etc.).

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

The invention claimed is:

1. A communication network for an aircraft, the communication network comprising:
 a low integrity device;
 a high integrity device;
 a communication bus communicably coupling the low integrity device and the high integrity device together, the communication bus including a first connection leg and a second connection leg; and
 a communication guard inserted in-line along the communication bus such that the communication guard is positioned between the low integrity device and the high integrity device, the communication guard including a first input, a first output, a second input, a second output, and a filter positioned between the first input and the first output, the filter configured to:
  store one or more rules defining at least one of a rate, a size, or a content type that is permissible for data transmissions from the low integrity device to the high integrity device;
  receive a respective data transmission from the low integrity device;
  evaluate characteristics of the respective data transmission relative to the one or more rules; and
  prevent the respective data transmission from passing through the communication guard to the high integrity device in response to the characteristics of the respective data transmission failing to comply with at least one of the one or more rules;
 wherein the first connection leg includes (i) a first connector extending between the low integrity device and the first input of the communication guard and (ii) a second connector extending between the first output of the communication guard and the high integrity device; and
 wherein the second connection leg includes (i) a third connector extending between the high integrity device and the second input of the communication guard and (ii) a fourth connector extending between the second output of the communication guard and the low integrity device.

2. The communication network of claim 1, wherein the communication guard is powered through the communication bus.

3. The communication network of claim 1, wherein the communication guard is powered from a power source external to the communication network.

4. The communication network of claim 1, further comprising a passive device positioned along at least one of (i) the first connector of the first connection leg between the low integrity device and the communication guard, (ii) the second connector of the first connection leg between the communication guard and the high integrity device, (iii) the third connector of the second connection leg between the high integrity device and the communication guard, or (iv) the fourth connector of the second connection leg between the communication guard and the low integrity device, the passive device configured to force a directionality of data flow along at least one of the first connection leg or the second connection leg.

5. A communication network for an aircraft, the communication network comprising:
 a low integrity device;
 a high integrity device;
 a communication bus communicably coupling the low integrity device and the high integrity device together, the communication bus including a first connection leg and a second connection leg; and
 a communication guard inserted in-line along the communication bus such that the communication guard is positioned between the low integrity device and the high integrity device, the communication guard including an input, an output, and a filter positioned between the input and the output, the filter configured to:
  store one or more rules defining at least one of a rate, a size, or a content type that is permissible for data transmissions from the low integrity device to the high integrity device;
  evaluate characteristics of a respective data transmission received from the low integrity device relative to the one or more rules; and
  prevent the respective data transmission from passing through the communication guard to the high integrity device in response to the characteristics of the respective data transmission failing to comply with at least one of the one or more rules;
 wherein the first connection leg includes (i) a first connector extending between the low integrity device and the input of the communication guard and (ii) a second connector extending between the output of the communication guard and the high integrity device; and
wherein the second connection leg extends directly between the high integrity device and the low integrity device, bypassing the communication guard.

6. The communication network of claim 5, wherein the second connection leg includes a passive device positioned therealong, the passive device configured to force a directionality of data flow along the second connection leg such that data does not flow from the low integrity device to the high integrity device along the second connection leg.

7. The communication network of claim 1, wherein the second input and the second output are directly connected.

8. The communication network of claim 1, further comprising a second filter positioned between the second input and the second output.

9. A communication network for an aircraft, the communication network comprising:
a first device;
a second device;
a communication bus communicably coupling the first device and the second device together, the communication bus including a first connector, a second connector, and a third connector;
a communication guard inserted in-line along the communication bus such that the communication guard is positioned between the first device and the second device, the communication guard including an input connected to the first device by the first connector, an output connected to the first device by the second connector, and a filter connected to the input, the filter configured to:
  store one or more rules defining at least one of a rate, a size, or a content type that is permissible for data transmissions from the first device to the second device;
  evaluate characteristics of a respective data transmission received from the first device relative to the one or more rules; and
  prevent the respective data transmission from passing through the communication guard to the second device in response to the characteristics of the respective data transmission failing to comply with at least one of the one or more rules; and
a converter coupled to the filter and the output;
wherein the third connector is a bi-directional connector extending between the converter and the second device;
wherein the converter is configured to convert a first protocol of the respective data transmission provided by the first device into a second, different protocol suitable for the second device; and
wherein the converter is configured to convert the second, different protocol of a second data transmission provided by the second device into the first protocol suitable for the first device.

10. The communication network of claim 9, wherein the converter is integrated into the communication guard.

11. The communication network of claim 9, wherein the communication guard is independent of the communication guard and positioned between the communication guard and the second device.

12. The communication network of claim 1, wherein the one or more rules are loadable onto the filter via a rule transmission provided by at least one of a programming device, the low integrity device, or the high integrity device.

13. The communication network of claim 12, wherein the filter is configured to verify the rule transmission prior to storing the one or more rules based on a digital signature provided with the rule transmission.

14. The communication network of claim 1, wherein the filter is configured to generate an audit trail regarding failed data transmissions and transmit the audit trail to at least one of the low integrity device, the high integrity device, or an external device.

15. The communication network of claim 4, wherein the passive device includes a diode.

16. The communication network of claim 15, wherein the diode includes a first diode positioned along the first connection leg and a second diode positioned along the second connection leg.

17. The communication network of claim 15, wherein the diode includes a first diode positioned along the third connector of the second connection leg and a second diode positioned along the fourth connector of the second connection leg.

18. The communication network of claim 15, wherein the diode includes a first diode positioned along the first connector of the first connection leg and a second diode positioned along the second connector of the first connection leg.

19. The communication network of claim 18, wherein the diode includes a third diode positioned along the third connector of the second connection leg and a fourth diode positioned along the fourth connector of the second connection leg.

20. The communication network of claim 1, wherein the high integrity device is a first device that has a critical function that needs to be preserved for operation of the aircraft, and wherein the low integrity device is a second device that has a secondary or ancillary function that does not need to be preserved for operation of the aircraft.

* * * * *